(12) United States Patent
Sawai

(10) Patent No.: US 9,894,533 B2
(45) Date of Patent: *Feb. 13, 2018

(54) COMMUNICATION DEVICE, PROGRAM AND COMMUNICATION CONTROL METHOD

(71) Applicant: SONY CORPORATION, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,070

(22) Filed: Oct. 15, 2015

(65) Prior Publication Data
US 2016/0037354 A1    Feb. 4, 2016

Related U.S. Application Data

(63) Continuation of application No. 14/015,005, filed on Aug. 30, 2013, now Pat. No. 9,185,568, which is a
(Continued)

(30) Foreign Application Priority Data

Jan. 20, 2009    (JP) ................................. 2009-009921

(51) Int. Cl.
*G06F 15/16*    (2006.01)
*H04W 16/14*    (2009.01)
(Continued)

(52) U.S. Cl.
CPC ............ *H04W 16/14* (2013.01); *H04L 41/32* (2013.01); *H04L 67/30* (2013.01); *H04W 24/08* (2013.01)

(58) Field of Classification Search
CPC .................................. H04L 41/32; H04L 67/30
(Continued)

(56) References Cited

U.S. PATENT DOCUMENTS

2005/0197118 A1*  9/2005  Mitchell .............. H04W 48/14
                                                    455/434
2006/0063543 A1*  3/2006  Matoba ................ H04L 1/0003
                                                    455/509
(Continued)

FOREIGN PATENT DOCUMENTS

CN          166533 A      9/2005
CN       101310465 A     11/2008
JP        2007-124283     5/2007

OTHER PUBLICATIONS

May 14, 2013, Japanese Office Action issued for related application No. JP2010-001072.
(Continued)

*Primary Examiner* — Hee Soo Kim
(74) *Attorney, Agent, or Firm* — Paratus Law Group, PLLC

(57) ABSTRACT

There is provided a communication device comprising: a detection unit that detects presence or absence of communication connection with a server storing data related to a communication environment of a communication area where a first communication service is provided; a data acquisition unit that acquires data related to a surrounding communication environment; and a determination unit that determines availability of usage of a second communication service using a part or whole of a spectrum assigned to the first communication service based on the data acquired by the data acquisition unit, wherein when communication connection with the server is not detected by the detection unit, the data acquisition unit senses a communication environment surrounding the communication device or receives data related to a communication environment from another communication device located near the communication device.

11 Claims, 9 Drawing Sheets

Related U.S. Application Data continuation of application No. 12/686,740, filed on Jan. 13, 2010, now Pat. No. 8,572,212.

(51) Int. Cl.
  *H04L 12/24* (2006.01)
  *H04L 29/08* (2006.01)
  *H04W 24/08* (2009.01)

(58) Field of Classification Search
  USPC .......................................................... 709/219
  See application file for complete search history.

(56) References Cited

U.S. PATENT DOCUMENTS

| | | | |
|---|---|---|---|
| 2008/0198870 A1* | 8/2008 | Brodersen | H04L 12/5692 370/465 |
| 2008/0221951 A1 | 9/2008 | Stanforth et al. | |
| 2009/0034508 A1 | 2/2009 | Gurney et al. | |
| 2009/0161610 A1* | 6/2009 | Kang | H04B 1/715 370/329 |
| 2009/0245119 A1* | 10/2009 | Kuffner | H04W 16/14 370/252 |
| 2010/0069013 A1 | 3/2010 | Chaudhri et al. | |
| 2010/0142454 A1* | 6/2010 | Chang | H04W 16/06 370/329 |

OTHER PUBLICATIONS

Harada, Dynamic Spectrum Access Network Based on Architecture of Cognitive Wireless Clouds, IEICE Technical Report, Oct. 2008, p. 173-180. SR2008-63.

Harada, et al., A Cognitive Wireless Network: Cognitive Wireless Clouds—Study of Phase 1 System Architecture and Design of Phase 2 System Architecture, IEICE Technical Report, Jul. 2008, p. 123-130. SR2008-37.

IEEE 802.22 WRAN, http://www.archive.org/web/web.php, 2 pages (2008).

Second Report and Order and Memorandum Opinion and Order, FCC 08-260, pp. 1-130 (2008).

* cited by examiner

COMMUNICATION DEVICE, PROGRAM AND COMMUNICATION CONTROL METHOD

CROSS REFERENCE TO PRIOR APPLICATION

This application is a continuation of U.S. patent application Ser. No. 14/015,005 (filed on Aug. 30, 2013) and Ser. No. 12/686,740 (filed on Jan. 13, 2010 and issued as U.S. Pat. No. 8,572,212 on Oct. 29, 2013), which claim priority to Japanese Patent Application No. 2009-009921 (filed on Jan. 20, 2009), which are all hereby incorporated by reference in their entirety.

BACKGROUND OF THE INVENTION

Field of the Invention

The present invention relates to a communication device, a program and a communication control method.

Description of the Related Art

Discussions have been taking place recently regarding secondary usage of a spectrum assigned for primary usage to provide a secondary communication service depending on the use condition of the spectrum. For example, the standard specification for allowing an unused channel contained in a spectrum of the U.S. digital TV broadcast (TV white spaces) to be available for radio communication has been studied in the IEEE802.22 working group ("IEEE802.22 WG on WRANs", [online], [Searched on Jan. 5, 2009], cf. Internet <URL:http://www.ieee802.org/22/>). Further, according to the report from the Federal Communications Commission (FCC) on November 2008, the discussions are directed toward permitting secondary usage of TV white spaces by using specific communication devices that have been authorized by fulfilling a certain criterion ("Second Report and Order and Memorandum Opinion and Order", [online], [Searched on Jan. 5, 2009], cf. Internet <URL:http://hraunfoss.fcc.gov/edocs_public/attachmatch/FCC-08-260A1.pdf>). In addition, there are moves, led by the EU, afoot to universally allocate a dedicated control channel called the cognitive pilot channel (CPC) for making dynamic spectrum access (DSA). Technological studies for a secondary usage system that makes DSA are also being progressed in IEEE Standards Coordinating Committee (SCC) 41. Further, as another example of secondary usage of a spectrum, there is a case where a secondary communication system is constructed using a simpler communication protocol in a service area of a majority system that uses a non-licensed spectrum. For example, it is assumed that when a WiFi (registered trademark) system that uses an Industry-Science-Medical (ISM) band is a majority system, a secondary communication system is constructed using another simple communication protocol in its service area.

In the implementation of secondary usage of a spectrum, it is necessary to sense the surrounding communication environment in advance and confirm that a communication service related to secondary usage (which is referred to hereinafter as a second communication service) does not cause an adverse effect on a communication service related to primary usage (which is referred to hereinafter as a first communication service).

SUMMARY OF THE INVENTION

However, when performing secondary usage of a spectrum, a device that determines the availability of secondary usage cannot always sense the surrounding communication environment accurately by itself. Although a possible approach is to sense the surrounding communication environment in collaboration with other devices, there is a concern that the load of sensing processing increases if the communication environment is uniformly sensed by a plurality of devices.

In light of the foregoing, it is desirable to provide a novel and improved communication device, program and communication control method capable of controlling a method for sensing a communication environment to determine the availability of secondary usage of a spectrum according to the state of communication connection.

According to an embodiment of the present invention, there is provided a communication device including: a detection unit that detects presence or absence of communication connection with a server storing data related to a communication environment of a communication area where a first communication service is provided; a data acquisition unit that acquires data related to a surrounding communication environment; and a determination unit that determines availability of usage of a second communication service using a part or whole of a spectrum assigned to the first communication service based on the data acquired by the data acquisition unit, wherein when communication connection with the server is not detected by the detection unit, the data acquisition unit senses a communication environment surrounding the communication device or receives data related to a communication environment from another communication device located near the communication device.

When communication connection with the server is detected, the detection unit may further identify whether the communication connection is wired connection or wireless connection.

When wireless connection with the server is detected by the detection unit, the data acquisition unit may acquire the data related to a communication environment by sensing the communication environment surrounding the communication device.

When the data related to the communication environment surrounding the communication device sensed by the data acquisition unit does not meet a specific criterion, the data acquisition unit may receive, from another communication device located near the communication device, data related to a communication environment sensed by said another communication device.

When wireless connection with the server is detected by the detection unit, the data acquisition unit may instruct said another communication device to perform sensing of a communication environment by using a technique with a smaller load compared to when communication connection with the server is not detected by the detection unit.

The data acquisition unit may further receive data related to the communication environment surrounding the communication device from the server.

When wired connection with the server is detected by the detection unit, the data acquisition unit may receive data related to the communication environment surrounding the communication device from the server.

When communication connection with the server is not detected by the detection unit and data obtained by sensing the communication environment surrounding the communication device does not meet a specific criterion, the data acquisition unit may receive data related to a communication environment from another communication device located near the communication device.

The data acquisition unit may change a range for acquiring data related to a communication environment depending on whether a device for permitting usage of the second communication service has authority to permit usage of the second communication service permanently or temporarily.

Data related to a communication environment may be received from a plurality of other communication devices located near the communication device.

According to another embodiment of the present invention, there is provided a program causing a computer controlling a communication device to implement functions including: a detection unit that detects presence or absence of communication connection with a server storing data related to a communication environment of a communication area where a first communication service is provided; a data acquisition unit that acquires data related to a surrounding communication environment; and a determination unit that determines availability of usage of a second communication service using a part or whole of a spectrum assigned to the first communication service based on the data acquired by the data acquisition unit, wherein when communication connection with the server is not detected by the detection unit, the data acquisition unit senses a communication environment surrounding the communication device or receives data related to a communication environment from another communication device located near the communication device.

According to another embodiment of the present invention, there is provided a communication control method in a communication device including the steps of: detecting presence or absence of communication connection with a server storing data related to a communication environment of a communication area where a first communication service is provided; acquiring data related to a surrounding communication environment; and determining availability of usage of a second communication service using a part or whole of a spectrum assigned to the first communication service based on the acquired data, wherein when communication connection with the server is not detected, the data is acquired in the communication device by sensing a communication environment surrounding the communication device or receiving the data from another communication device located nearby.

According to the embodiments of the present invention described above, it is possible to provide a communication device, a program and a communication control method capable of controlling a method for sensing a communication environment to determine the availability of secondary usage of a spectrum according to the state of communication connection.

DETAILED DESCRIPTION OF THE EMBODIMENT(S)

Figure 1:
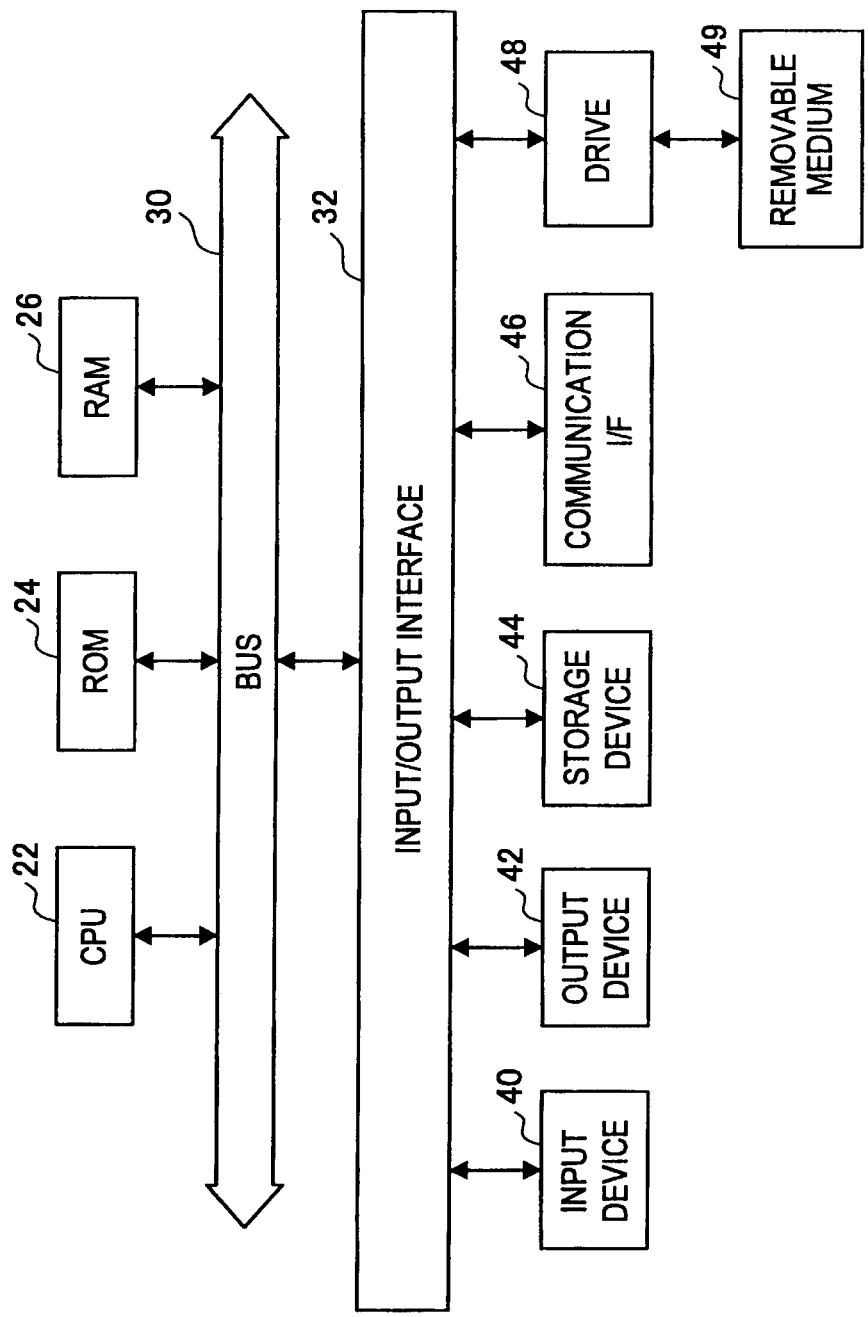
FIG. 1 is a block diagram showing an example of a hardware configuration of a communication device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Functional Classification for Secondary Usage of Spectrum
2. Exemplary Hardware Configuration of Communication Device
3. Details of Control according to Configuration of Communication System
   3-1. System Configuration in which Wired Connection is Available
   3-2. System Configuration in which Wireless Connection is Available
   3-3. System Configuration in which No Communication Connection is Available
   3-4. Logical Configuration of Device
   3-5. Flow of Processing
4. Example of Sensed Data
5. Summary

1. FUNCTIONAL CLASSIFICATION FOR SECONDARY USAGE OF SPECTRUM

Firstly, the principal functions (FC: Function Class) to be incorporated into communication devices that join a system in order to implement secondary usage of a spectrum are listed below. A communication device that joins a system incorporates one or more than one of the seven functions (FC1 to FC7) listed below.

FC1: Secondary communication authentication node
   FC2: Primary communication relay node
   FC3: Advanced determination node
   FC4: Determination node
   FC5: Smart sensor node
   FC6: Sensor node
   FC7: Communication node

[1-1. Secondary Communication Authentication Node (FC1)]

The secondary communication authentication node (FC1) permits start or extension of the second communication service in accordance with the spectrum policy when it is determined that secondary usage of a spectrum is available by the advanced determination node or the determination node, which are described later. The secondary communication authentication node may check whether a terminal identifier, an authentication identifier, a device identifier, a sensor identifier or the like which is transmitted from the advanced determination node or the determination node is contained in a list of identifiers that have made an unauthorized use of a frequency in the past, for example. If any of the above identifiers is contained in the list of identifiers that have made an unauthorized use, for example, the secondary communication authentication node can reject start or extension of the second communication service. Further, if a base station that controls the traffic of the first communication service is the secondary communication authentication node, the base station may refer to history of user traffic or the like and grant permission for secondary usage for a time period or a place with many unoccupied channels. It is thereby possible to make some unoccupied channels open and enable effective use of a spectrum. Further, the secondary communication authentication node may generate, acquire or update information to be used for determination about the availability of secondary usage by the advanced determination node or the determination node and supply the information to the advanced determination node or the determination node. The information to be used for determination about the availability of secondary usage contains community-based or service-area-based regulatory information such as a power level usable for sensing and system information (for example, band or bandwidth currently in use) provided by neighboring base stations, for example. The secondary communication authentication node can thus serve as a so-called coordinator of the second communication service.

There are two kinds of secondary communication authentication nodes: a permanent secondary communication authentication node and a temporary secondary communication authentication node. The permanent secondary communication authentication node is a communication device that is authorized to coordinate the second communication service because it meets a predetermined criterion set by statute or the like. On the other hand, the temporary secondary communication authentication node is a communication device that receives authority from the permanent secondary communication authentication node because it meets a specific criterion according to a communication environment or the like and thereby temporarily makes coordination of the second communication service within the range of the granted authority (for example, within a range of the limited frequency channels or resource blocks, or within a range of a transmission power under a specific maximum value). Herein, "coordination" of a communication service may contain, for example, allocation of resources for the communication service. The temporary secondary communication authentication node may, for example, perform collaborative resource allocation for a second communication service by exchanging scheduling information each other with the permanent secondary communication authentication node.

[1-2. Primary Communication Relay Node (FC2)]

The primary communication relay node (FC2) serves as a pseudo base station or access point that, when connected with a communication network related to primary usage (which is referred to hereinafter as a first communication network), allows nearby nodes to use the first communication service.

[1-3. Advanced Determination Node (FC3)]

The advanced determination node (FC3) determines whether extension of a communication network related to secondary usage (which is referred to hereinafter as a second communication network) is available based on a secondary communication profile acquired from the determination node, which is described later. The secondary communication profile typically contains sensed data (including link data statistically calculated from sensed data). The secondary communication profile may further contain scheduling information for each of the second communication services. The secondary communication profile may further contain an identifier of the spectrum policy assigned to each determination node or the like. For example, the advanced determination node may determine that the second communication network is extendable when a criterion for starting secondary usage (a sensing level or a database) coincides with a nearby second communication network. Alternatively, the advanced determination node may determine that the second communication network is extendable when all networks satisfy the strictest sensing level. Further, the advanced determination node may determine that the second communication network is extendable when a database is accessible by using a common channel between networks. Furthermore, when communication devices to be connected with each other are included in two adjacent networks, the advanced determination node may determine the availability of extension of the second communication network with conditions that the purpose is limited to relaying or multi-hopping data between the communication devices. Furthermore, the advanced determination node may determine that an extension of a second communication network is available, when it is possible to raise the maximum transmission power without causing an adverse effect to the first communication service by utilizing a interference control technology based on beam forming or transmission power control. If the advanced determination node determines that extension of the second communication network is available, it requests the secondary communication authentication node to permit extension of the second communication network. Typically, the advanced determination node has a function of the determination node, which is described later, also. It should be noted that, when the advanced determination node and the secondary communication authentication node exist on a physically same device, a communication between the advanced determination node and the secondary communication authentication node is performed as a communication between logical functions (or it may be omitted). On the other hand, when the advanced determination node and the secondary communication authentication node exist on physically different devices, a communication between the advanced determination node and the secondary communication authentication node is performed using either wireless ling or wired link. The wireless link herein may be a wireless link based on the first communication service, for example. The wired link herein may be a link either on a private network (for example, core network) or on a public network (for example, ADSL).

[1-4. Determination Node (FC4)]

The determination node (FC4) determines whether secondary usage of a spectrum is available according to the spectrum policy based on sensed data sensed or acquired by the smart sensor node or the sensor node, which are described later. For example, the determination node may determine that secondary usage of a spectrum is available when a power level sensing result of a spectrum as a target of secondary usage is lower than a power sensing level defined in the above-described regulatory information. Alternatively, the determination node may determine that secondary usage of a spectrum is available when secondary usage is permitted for a spectrum as a target of secondary usage as a result of making inquiry to a data server, which is described later, for example. Further, the determination node may determine that secondary usage of a spectrum is available when a power level sensing result of a spectrum as a target of secondary usage is lower than a power sensing level indicated by data obtained from the data server described above, for example. The power level sensing result of a spectrum as a target of secondary usage may be an averaged value of A/D sampling output values, for example. If the determination node determines that secondary usage of a spectrum is available, it requests the secondary communication authentication node to permit start of the second communication service. Then, if start of the second communication service is permitted by the secondary communication authentication node, the determination node invites users of the second communication service by transmitting a beacon to nearby communication devices, for example, and starts the second communication service. Beacons transmitted by the determination node may be used by the nearby communication devices for detection, synchronization, acquisition of system information and the like regarding the second communication service. For example, primary synchronization signal and secondary synchronization signal, signals on PBCH (Physical Broadcast Channel) or the like are an example of the above-described beacons. The determination node thus serves as an engine for cognitive radio that switches from the first communication service to the second communication service. Further, the determination node generates the secondary communication profile in response to an instruction from the above-described advanced determination node and transmits the profile to the advanced determination node. It should be noted that, similarly to the above description about the advanced determination node, a communication between the determination node and the secondary communication authentication node is also performed as a communication between logical functions (In a case that they are on the same device. But the above communication processes may be omitted) or as a communication using wireless ling or wired link (In a case that they are on different devices.).

In communication control processing according to an embodiment of the present invention which is described later, a sensing method of a communication environment to be used for determination of start or extension of a secondary usage system is decided principally by the advanced determination node or the determination node described above. A sensing method of a communication environment depends on which pattern of communication connection is available for the advanced determination node or the determination node to communicate with a server that integrally stores data related to a communication environment in a service area of the first communication service. Details of specific control of the sensing method are further described later.

[1-5. Smart Sensor Node (FC5)]

The smart sensor node (FC5) acquires sensed data related to a communication environment stored in each node from the sensor node or the smart sensor node located in the nearby vicinity of its own device. The smart sensor node may further add sensed data sensed in its own device to the acquired sensed data (or use the sensed data sensed in its own device only). The smart sensor node thus serves as an extended sensor capable of acquiring sensed data necessary for determination of secondary usage in collaboration with the nearby nodes. Further, the smart sensor node transmits the stored sensed data in response to an instruction from the smart sensor node or the determination node.

[1-6. Sensor Node (FC6)]

The sensor node (FC6) senses the communication environment surrounding its own device and generates sensed data. As described later in detail, the sensed data is typically data indicating the surrounding communication environment relating to the first communication service. For example, a power level or energy of received signals or scheduling information of the first communication service may be used as data indicating the surrounding communication environment. The sensor node thus serves as a sensor that generates sensed data necessary for determination of secondary usage. Further, the sensor node transmits the generated sensed data in response to an instruction from the smart sensor node or the determination node.

[1-7. Communication Node (FC7)]

The communication node (FC7) performs communication using the second communication service when secondary usage of a spectrum is available. The communication node thus serves as a general communication device. A communication protocol used for the second communication service may be a desired communication protocol such as IEEE802.11a/b/g/n/s, Zigbee or WiMedia, for example.

[1-8. Scope of the Term "Secondary Usage"]

In this specification, the term "secondary usage" typically means utilization of an additional or alternative communication service (a second communication service) using a part or whole of a spectrum assigned to a first communication service as described above. In this context about the meaning of the term "secondary usage", the first communication service and the second communication service may be services of different types or the same type. The services of different types may be selected from services such as digital TV broadcasting service, satellite communication service, mobile communication service, wireless LAN access service, P2P (Peer To Peer) connection service and the like. On the other hand, services of the same type may contain, for example, a relationship between a service of macro-cell provided by a communication carrier and a service of femto-cell operated by users or MVNO (Mobile Virtual Network Operator). Additionally, services of the same type may contain, for example, a relationship between a service provided by a base station of a communication service according to WiMAX, LTE (Long Term Evolution), LTE-A (LTE-Advanced) or the like and a service provided by relay station (relay node) to cover a spectrum hole. Further, a second communication service may be a service utilizing a plurality of fragmentary frequency bands aggregated using spectrum aggregation technology. Furthermore, a second communication service may be a supplementary communication service provided by femto-cells, relay stations or small or medium sized base stations for smaller service area than normal sized base stations within a service area of a normal sized base station. The subject matter of each embodiment described in this specification is applicable to every type of mode of such secondary usages.

2. EXEMPLARY HARDWARE CONFIGURATION OF COMMUNICATION DEVICE

A hardware configuration of a communication device that incorporates one or more than one of the functions FC1 to FC7 listed in the previous section is described hereinbelow.

FIG. 1 is a block diagram showing an example of a hardware configuration of the communication device described above. The communication device shown in FIG. 1 by way of illustration includes a central processing unit (CPU) 22, read only memory (ROM) 24, random access memory (RAM) 26, a bus 30, an input/output interface 32, an input device 40, an output device 42, a storage device 44, a communication interface (I/F) 46 and a drive 48.

In FIG. 1, the CPU 22 controls the operation of a general-purpose computer as a whole. The ROM 24 stores programs executed by the CPU 22, data and so on. The RAM 26 temporarily stores a program or data during execution of processing by the CPU 22.

The CPU 22, the ROM 24 and the RAM 26 are connected with one another through the bus 30. The input/output interface 32 is also connected to the bus 30.

The input/output interface 32 connects the CPU 22, the ROM 24 and the RAM 26 with the input device 40, the output device 42, the storage device 44, the communication interface 46 and the drive 48.

The input device 40 receives an instruction or information input from a user through a button, a switch, a lever, a mouse, a keyboard, a touch panel or the like, for example. The output device 42 outputs information to a user through a display device such as a cathode ray tube (CRT), a liquid crystal display or an organic light emitting diode (OLED), a light emitting device such as a lamp, or an audio output device such as a speaker, for example. The storage device 44 is made up of a hard disk drive or flash memory, for example, and stores programs, data and so on. The communication interface 46 mediates communication processing for the first communication service or the second communication service. A removable medium 49 is loaded to the drive 48 according to need.

Each of the functions FC1 to FC7 listed in the previous section may be implemented as software, for example. In the case where each function is implemented as software, for example, a program constituting software is stored in the ROM 24 or the storage device 44 shown in FIG. 1, loaded to the RAM 26 upon execution and executed by the CPU 22. Alternatively, each function may be implemented as hardware by using a dedicated processor which is additionally mounted to the communication device.

3. DETAILS OF CONTROL ACCORDING TO CONFIGURATION OF COMMUNICATION SYSTEM

Figure 2:
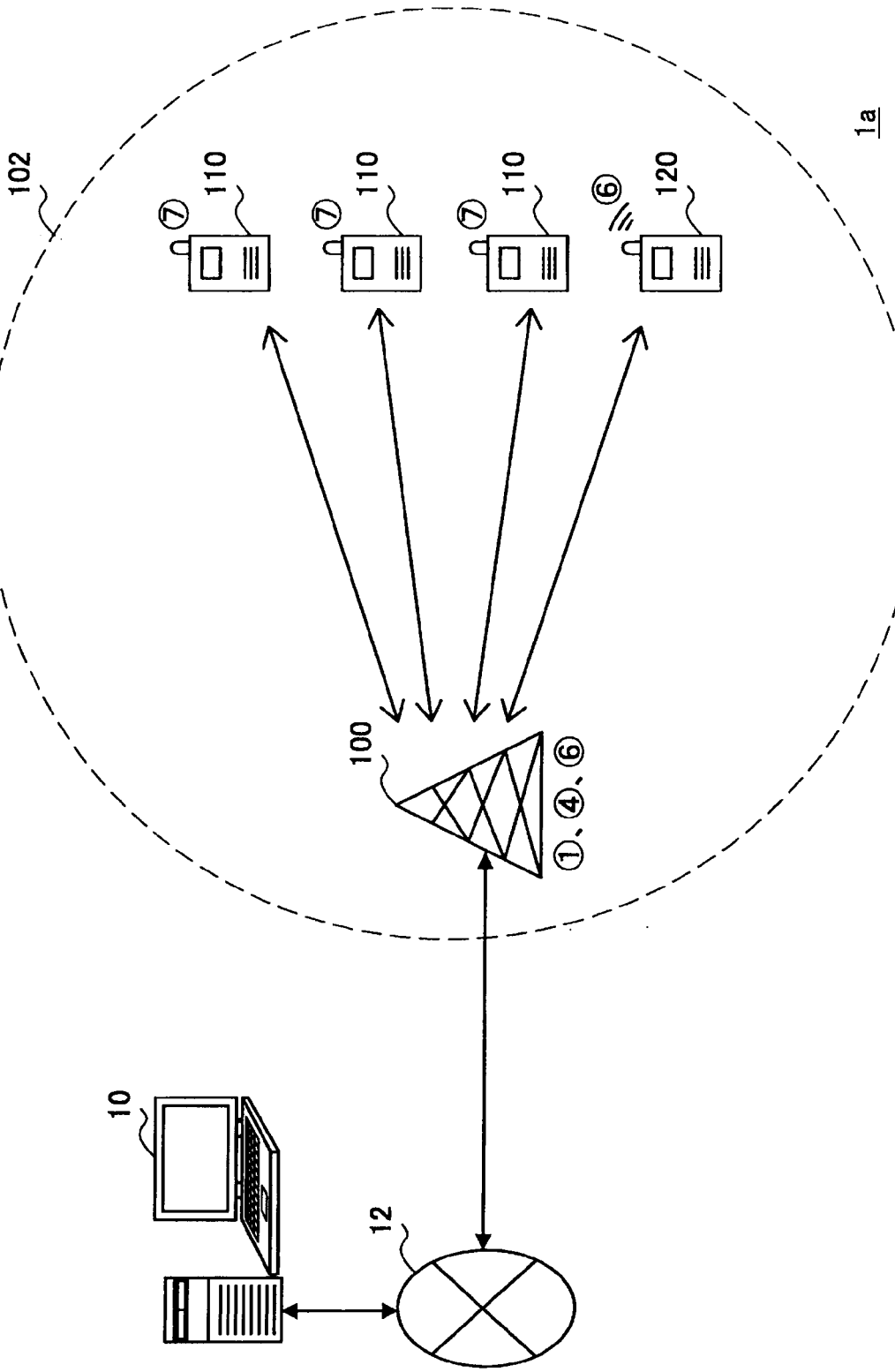
FIG. 2 is a schematic view showing an example of a system configuration in which wired connection with a data server is available.

As described above, in an embodiment of the present invention, a sensing method of a communication environment that is used for determination of start or extension of secondary usage is controlled according to the presence or absence of communication connection between a server integrally storing data related to a communication environment and the determination node or the advanced determination node and a pattern of the communication connection. In this section, an exemplary system configuration of a secondary usage system is presented for each pattern of communication connection, and a logical configuration of a communication device that performs control according to the pattern of communication connection is described.
[3-1. System Configuration in which Wired Connection is Available]
(First System Configuration)
FIG. 2 is a schematic view showing an example of a system configuration in which wired connection is available between a server integrally storing data related to a communication environment and the determination node. A communication system having the system configuration shown therein is referred to as a communication system 1a.

Circled numerals in FIG. 2 correspond to the numbers of the functions (FC) described above.

Referring to FIG. 2, the communication system 1a includes a base station 100, three communication devices 110 and a sensor device 120. The three communication devices 110 and the sensor device 120 are located inside an area 102 where communication with the base station 100 is possible. The base station 100 is connected to a server 10 through a network 12, which is a wired network.

The server 10 is a server that integrally stores data related to a communication environment of the first communication service provided by the base station 100. The server 10 may serve also as a device that provides the first communication service by using the base station 100. The first communication service may be a digital TV broadcast service, for example, or another kind of communication service. The data stored in the server 10 may contain data about a frequency currently in use for each location in a communication area, use history data of a frequency for each location, prediction data related to a condition of traffic predicted from the use history data or the like, for example. The server 10 can supply such data related to a communication environment (which is referred to hereinafter as server data) in response to a request from the advanced determination node or the determination node described above.

The base station 100 provides the above-described first communication service to the devices located inside the area 102. Further, the base station 100 coordinates secondary usage of an unused part (or whole) of the spectrum assigned to the first communication service. To be more specific, the base station 100 operates as the secondary communication authentication node (FC1) and the determination node (FC4) described above. Further, the base station 100 may operate as the sensor node (FC6). Specifically, the base station 100 first acquires data related to the surrounding communication environment by a method decided by control processing, which is described later. Next, based on the acquired data, the base station 100 determines whether secondary usage of a spectrum is available according to the spectrum policy. If the base station 100 determines that secondary usage is available based on the sensed data, it starts a communication service related to secondary usage, which is a second communication service. The base station 100 in this case is a permanent secondary communication authentication node that meets a predetermined criterion set by statute or the like.

On the other hand, the communication devices 110 operate as the communication node (FC7) described above. Specifically, the communication devices 110 transmit and receive radio signals to and from the base station 100.

The sensor device 120 operates as the sensor node (FC6) described above. Specifically, in response to an instruction from the base station 100, the sensor device 120 can generate sensed data related to a communication environment by sensing the communication environment surrounding its own device and then transmit the generated sensed data to the base station 100.

Figure 3:
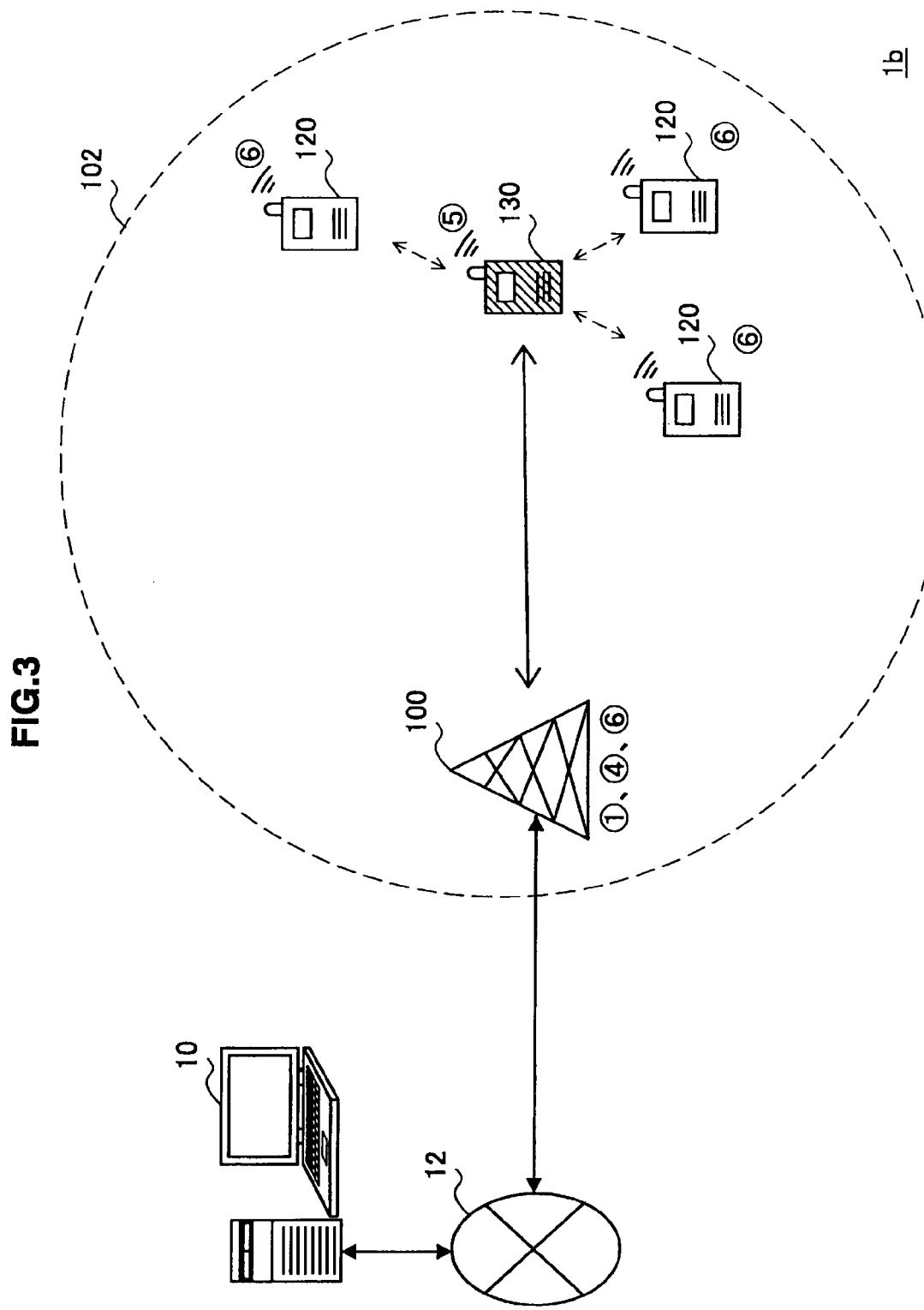
FIG. 3 is a schematic view showing another example of a system configuration in which wired connection with a data server is available.

(Second System Configuration)
FIG. 3 is a schematic view showing another example of a system configuration in which wired connection is available between a server integrally storing data related to a communication environment and the determination node. A communication system having the system configuration shown therein is referred to as a communication system 1b.

Referring to FIG. 3, the communication system 1b includes a base station 100, three sensor devices 120 and a smart sensor device 130. The three sensor devices 120 and the smart sensor device 130 are located inside an area 102 where communication with the base station 100 is possible. The base station 100 is connected to a server 10 through a network 12, which is a wired network.

In the communication system 1b, in response to an instruction from the smart sensor device 130 located in the nearby vicinity, the sensor devices 120 can transmit sensed data generated by sensing the communication environment surrounding their own devices to the smart sensor device 130.

On the other hand, the smart sensor device 130 operates as the smart sensor node (FC5) described above. Specifically, the smart sensor device 130 can give an instruction for sensing of a communication environment to the sensor devices 120 in the nearby vicinity, acquire sensed data from the sensor devices 120 and then transmit the acquired sensed data to the base station 100. At this time, the smart sensor device 130 may add sensed data obtained by sensing the surrounding communication environment of its own to the acquired data.

If wired connection is available between the server 10 and the base station 100 as in the communication system 1a or 1b, it is preferred that the base station 100 serving as the determination node receives data related to a communication environment from the server 10 and uses the data. It is thereby possible to make determination about start (or extension) of secondary usage of a spectrum without increasing the load of distributed sensing, for example.

[3-2. System Configuration in which Wireless Connection is Available]

A system configuration in which wired connection is unavailable and only wireless connection is available with the server 10 in the determination node (or the smart sensor node) is described hereinbelow.

(Third System Configuration)

Figure 4:
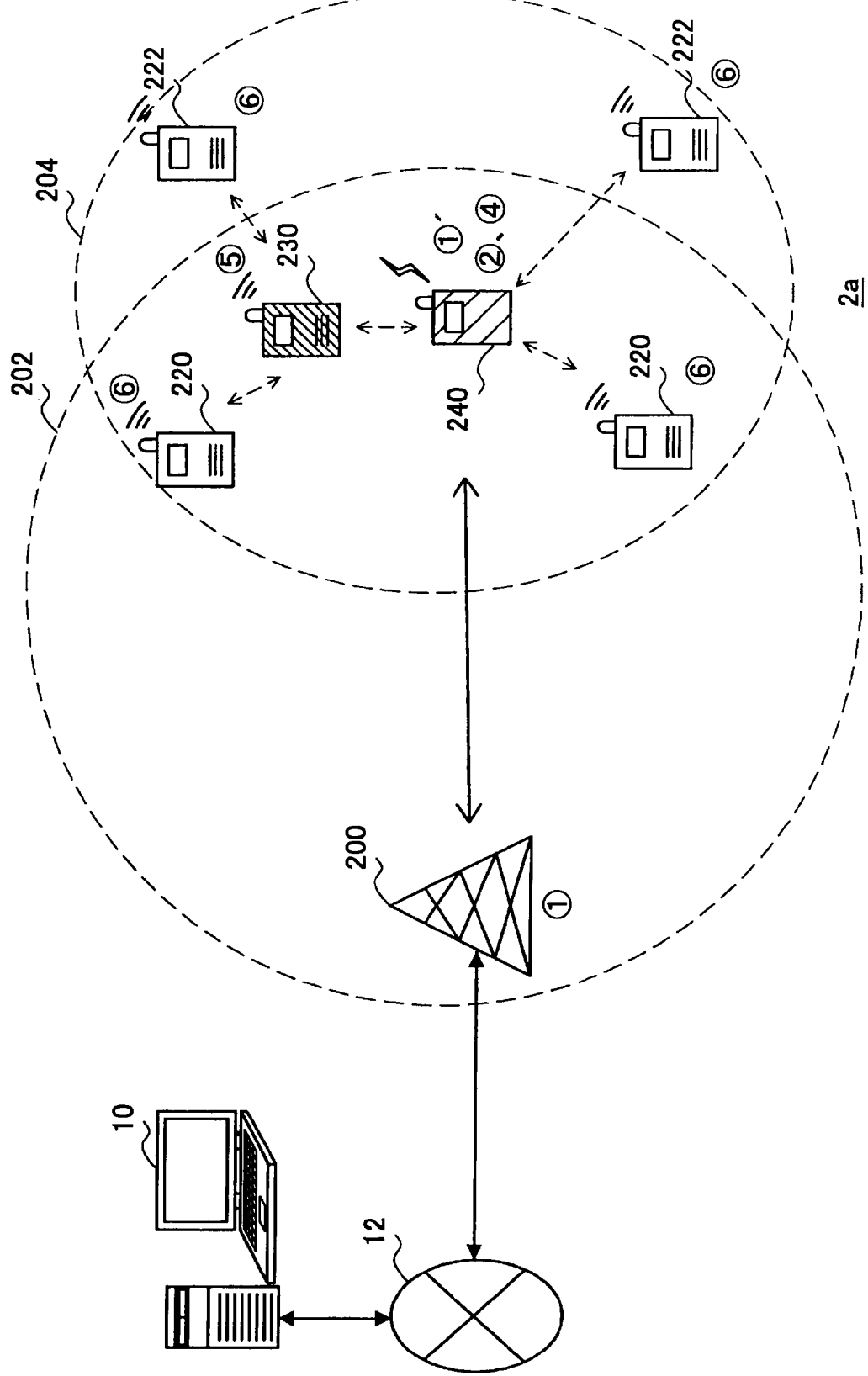
FIG. 4 is a schematic view showing an example of a system configuration in which wireless connection with a data server is available.

FIG. 4 is a schematic view showing an example of a system configuration in which wireless connection is available between a server integrally storing data related to a communication environment and the determination node. A communication system having the system configuration shown therein is referred to as a communication system 2a.

Referring to FIG. 4, the communication system 2a includes a base station 200, two sensor devices 220, two sensor devices 222, a smart sensor device 230, and a determination device 240. The two sensor devices 220, the smart sensor device 230 and the determination device 240 are located inside an area 202 where communication with the base station 200 is possible. The base station 200 is connected to a server 10 through a network 12, which is a wired network.

The base station 200 can provide the first communication service to the devices located inside the area 202. Further, the base station 200 can temporarily grant authority for permitting secondary usage of an unused part (or whole) of the spectrum assigned to the first communication service to the determination device 240, which is described later, according to a communication environment. Thus, the base station 200 operates as the permanent secondary communication authentication node (FC1) described above. Instead of that the base station 200 is the secondary communication authentication node, another node in the network 12 may be the secondary communication authentication node, and the base station 200 may mediate grant of authority from the node to the determination device 240.

The sensor devices 220 operate as the sensor node (FC6) described above. Specifically, in response to an instruction from the smart sensor device 230 or the determination device 240, the sensor devices 220 can generate sensed data related to a communication environment by sensing the communication environment surrounding their own devices and transmit the data. The sensor devices 222 also operate as the sensor node (FC6) described above. Specifically, in response to an instruction from the smart sensor device 230 or the determination device 240, the sensor devices 222 can generate sensed data related to a communication environment by sensing the communication environment surrounding their own devices and transmit the data.

The smart sensor device 230 operates as the smart sensor node (FC5) described above. Specifically, the smart sensor device 230 can give an instruction for sensing a communication environment to the sensor devices 220 or 222 located in the nearby vicinity, acquire sensed data and transmit the acquired sensed data to the determination device 240. At this time, the smart sensor device 230 may add sensed data obtained by sensing the surrounding communication environment of its own to the acquired data.

The determination device 240 operates as the primary communication relay node (FC2) and the determination node (FC4) described above. Further, the determination device 240 can operate as the temporary secondary communication authentication node (FC1) described above. Specifically, the determination device 240 first acquires data related to the surrounding communication environment by a method decided by control processing, which is described later. Next, based on the acquired data, the determination device 240 determines whether provision of the second communication service is available using a spectrum which is not actually used in the spectrum assigned to the first communication service according to the spectrum policy. If the determination device 240 determines from the sensed data that provision of the second communication service is available, the determination device 240 requests the base station 200 for temporary grant of authority for permitting start of the second communication service. At this time, the determination device 240 transmits the acquired sensed data, additionally obtained location data of its own device or the like to the base station 200. If the authority is granted in accordance with the transmitted data, the determination device 240 starts the second communication service with a communication device located in the nearby vicinity (e.g. an area 204) of its own device.

Further, the determination device 240 operates as the primary communication relay node and thus serves as a pseudo base station or access point for the first communication service, and it can relay a communication packet corresponding to the first communication service which is transmitted from the sensor device 222, for example, to the base station 200.

(Fourth System Configuration)

Figure 5:
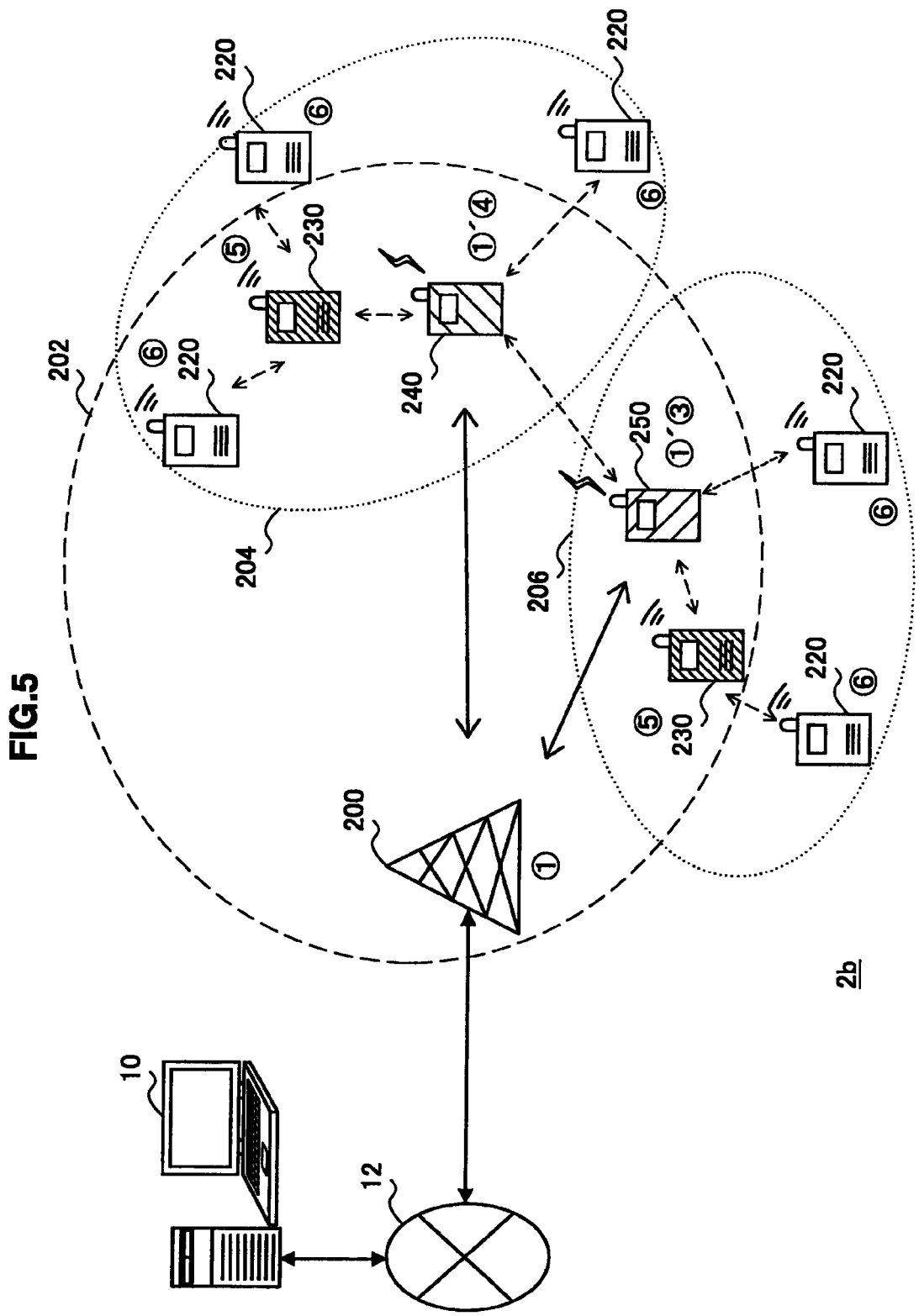
FIG. 5 is a schematic view showing another example of a system configuration in which wireless connection with a data server is available.

FIG. 5 is a schematic view showing another example of a system configuration in which wireless connection is available between a server integrally storing data related to a communication environment and the determination node. A communication system having the system configuration shown therein is referred to as a communication system 2b.

Referring to FIG. 5, the communication system 2b includes a base station 200, five sensor devices 220, two smart sensor devices 230, a determination device 240 and an advanced determination device 250. The base station 200 is connected to a server 10 through a network 12, which is a wired network.

In the communication system 2b, the two smart sensor devices 230 acquire sensed data from the sensor devices 220 located in the nearby vicinity and transmit the acquired sensed data respectively in response to an instruction from the determination device 240 or the advanced determination device 250.

The determination device 240 acquires data related to the surrounding communication environment by a method decided by control processing, which is described later, and determines whether start of secondary usage of a spectrum is available or not, as described above with reference to FIG. 4. Further, in response to a request from the advanced determination device 250, the determination device 240 can create a secondary communication profile containing the acquired sensed data, link data calculated from the sensed data, the spectrum policy or the like and transmit the profile to the advanced determination device 250.

The advanced determination device 250 operates as the advanced determination node (FC3) described above. Further, the advanced determination device 250 can operate as the temporary secondary communication authentication node (FC1) described above. Specifically, the advanced determination device 250 first gives instruction for transmission of the secondary communication profile to the determination device 240.

The advanced determination device 250 then acquires data related to the surrounding communication environment by a method decided by control processing, which is described later, and determines whether extension of the second communication network is available. If the advanced determination device 250 determines that extension of the second communication network is available, the advanced determination device 250 requests the base station 200 for temporary grant of authority for permitting extension of the second communication network. At this time, the advanced determination device 250 transmits a determination result indicating that extension of the second communication network is available, data used for the determination or the like to the base station 200. If the authority is granted in accordance with the data or the like, the advanced determination device 250 starts provision of the second communication service with the extended network range to communication devices located in the nearby vicinity of its own device and the determination device 240.

In the communication system 2a or 2b, wired connection is unavailable and only wireless connection is available with the server 10 in the determination device 240 or the advanced determination device 250. In this case, it is preferred that the determination device 240 or the advanced determination device 250 receives data related to a communication environment from the server 10 and uses the data, and further performs sensing in its own device also. If a sensing result in its own device is insufficient, distributed sensing may be performed by using the sensor devices 220 or the smart sensor devices 230. It is thereby possible to make determination about start (or extension) of secondary usage of a spectrum without making the heavy load due to data downloading on wireless connection with the server 10. In this example, the case where the determination device 240 and the advanced determination device 250 are the temporary secondary communication authentication nodes is described. However, the same is applicable to the case where the determination device 240 or the advanced determination device 250 is the permanent secondary communication authentication node and only wireless connection is available with the server 10.

[3-3. System Configuration in which No Communication Connection is Available]

The case where wired connection and wireless connection are both unavailable with the server 10 in the determination node (or the smart sensor node) is described hereinbelow.

(Fifth System Configuration)

Figure 6:
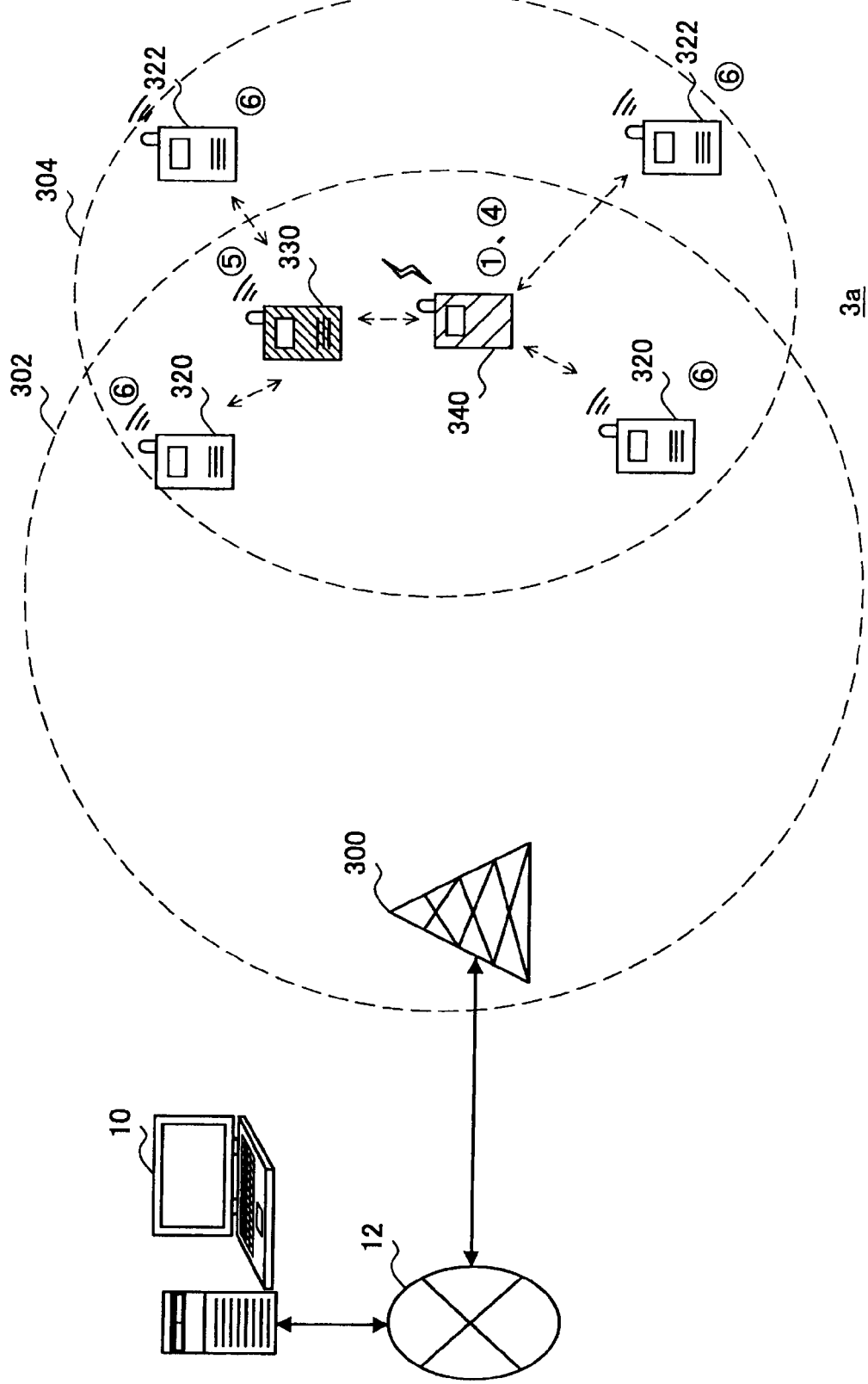
FIG. 6 is a schematic view showing an example of a system configuration in which communication connection with a data server is unavailable.

FIG. 6 is a schematic view showing an example of a system configuration in which both of wired connection and wireless connection are not available between a server integrally storing data related to a communication environment and the determination node. A communication system having the system configuration shown therein is referred to as a communication system 3a.

Referring to FIG. 6, the communication system 3a includes a base station 300, two sensor devices 320, two sensor devices 322, a smart sensor device 330, and a determination device 340. The base station 300 is connected to a server 10 through a network 12, which is a wired network.

The base station 300 can provide the first communication service to the devices located inside the area 302.

The sensor devices 320 operate as the sensor node (FC6) described above. Specifically, in response to an instruction from the smart sensor device 330 or the determination device 340, the sensor devices 320 can generate sensed data related to a communication environment by sensing the communication environment surrounding their own devices and then transmit the data. The sensor devices 322 also operate as the sensor node (FC6) described above. Specifically, in response to an instruction from the smart sensor device 330 or the determination device 340, the sensor devices 322 can generate sensed data related to a communication environment by sensing the communication environment surrounding their own devices and transmit the data.

The smart sensor device 330 operates as the smart sensor node (FC5) described above. Specifically, the smart sensor device 330 can give an instruction for sensing a communication environment to the sensor devices 320 or 322 located in the nearby vicinity, acquire sensed data and transmit the acquired sensed data to the determination device 340. At this time, the smart sensor device 330 may add sensed data obtained by sensing the surrounding communication environment of its own to the acquired data.

The determination device 340 operates as the permanent secondary communication authentication node (FC1) and the determination node (FC4) described above. Specifically, the determination device 340 first acquires data related to the surrounding communication environment by a method decided by control processing, which is described later. In the case of the communication system 3a, however, because the determination device 340 is incapable of connection with the server 10 by wired connection or wireless connection, the determination device 340 acquires sensed data related to a communication environment from its own device or the sensor devices 320 or the smart sensor device 330 in the nearby vicinity. Next, based on the acquired data, the determination device 340 determines whether provision of the second communication service is available using a spectrum which is not actually used in the spectrum assigned to the first communication service according to the spectrum policy. If the determination device 340 determines from the acquired data that provision of the second communication service is available, the determination device 340 starts the second communication service with a communication device located in the nearby vicinity (e.g. an area 304) of its own device. In the communication system 3a, the determination device 340 is not necessarily located inside the communication area 302 where the first communication service is provided.

(Sixth System Configuration)

Figure 7:
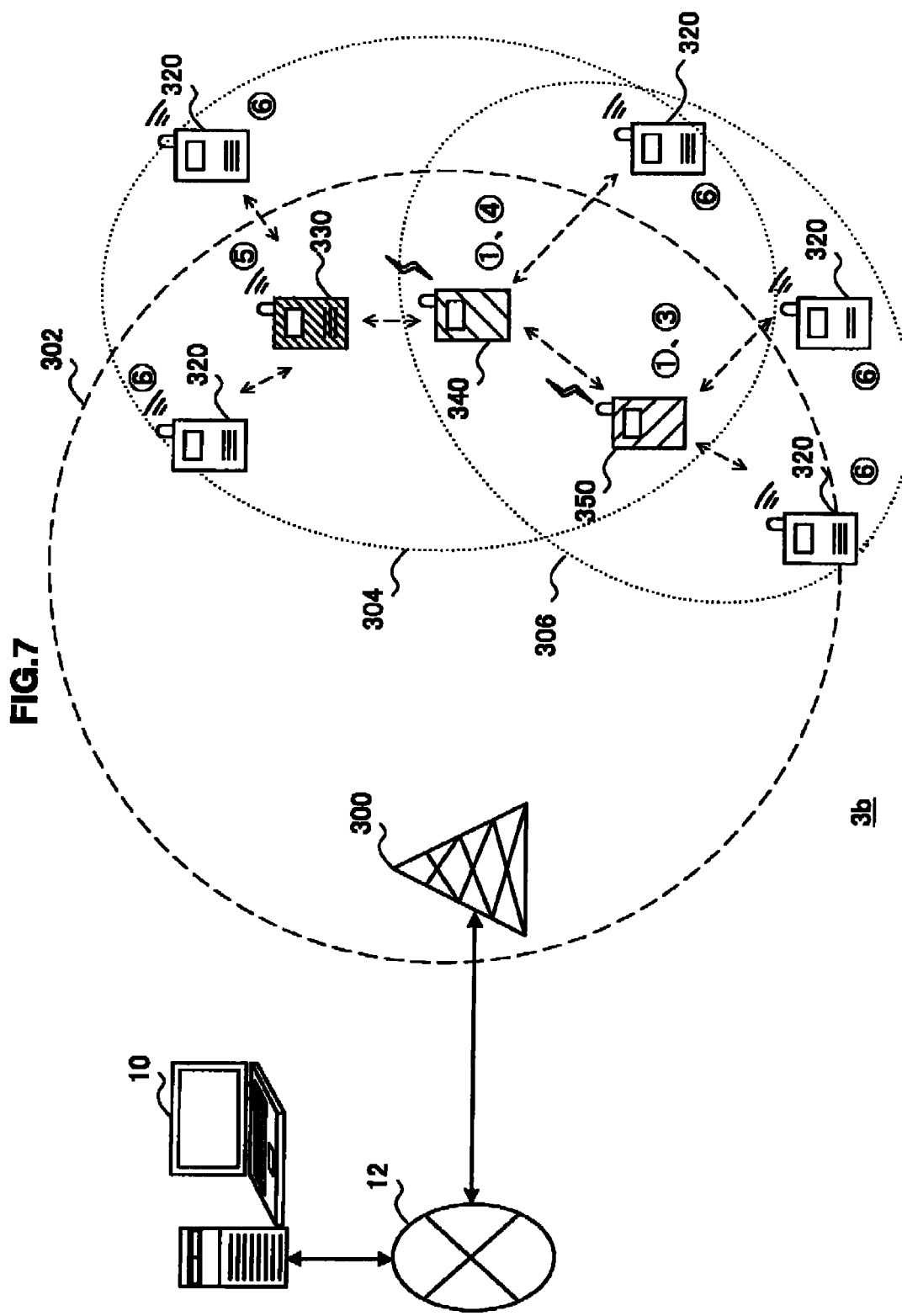
FIG. 7 is a schematic view showing another example of a system configuration in which communication connection with a data server is unavailable.

FIG. 7 is a schematic view showing another example of a system configuration in which both of wired connection and wireless connection are not available between a server integrally storing data related to a communication environment and the determination node. A communication system having the system configuration shown therein is referred to as a communication system 3b.

Referring to FIG. 7, the communication system 3b includes a base station 300, five sensor devices 320, a smart sensor device 330, a determination device 340 and an advanced determination device 350. The base station 300 is connected to a server 10 through a network 12, which is a wired network.

In the communication system 3b, the sensor devices 320 can transmit sensed data generated by sensing the communication environment surrounding their own devices in response to an instruction from the smart sensor device 330, the determination device 340 or the advanced determination device 350

The smart sensor device 330 can transmit sensed data acquired from the sensor devices 320 in the nearby vicinity to the determination device 340 in response to an instruction from the determination device 340. The smart sensor device 330 may further add sensed data obtained by sensing the surrounding communication environment of its own to the acquired data.

The determination device 340 acquires data related to the surrounding communication environment by a method decided by control processing, which is described later, and determines whether start of secondary usage of a spectrum is available or not, as described above with reference to FIG. 6. Further, in response to a request from the advanced determination device 350, the determination device 340 can create a secondary communication profile containing the acquired sensed data, link data calculated from the sensed data, the spectrum policy or the like and transmit the profile to the advanced determination device 350.

The advanced determination device 350 operates as the permanent secondary communication authentication node (FC1) and the advanced determination node (FC3) described above. Specifically, the advanced determination device 350 gives instruction for transmission of the secondary communication profile to the determination device 340. The advanced determination device 350 further acquires data related to the surrounding communication environment by a method decided by control processing, which is described later, and determines whether extension of the second communication network is available. If the advanced determination device 350 determines that extension of the second communication network is available, the advanced determination device 350 starts provision of the second communication service with the extended network range to communication devices located in the nearby vicinity of its own device and the determination device 340. In the communication system 3b, the determination device 340 or the advanced determination device 350 is not necessarily located inside the communication area 302 where the first communication service is provided.

In the communication system 3a or 3b, wired connection and wireless connection with the server 10 are not available in the determination device 340 or the advanced determination device 350. In this case, it is preferred that the determination device 340 or the advanced determination device 350 senses the surrounding communication environment of its own and further performs distributed sensing by using the sensor devices 320 or the smart sensor device 330. For example, the determination device 340 or the advanced determination device 350 may perform distributed sensing by using the sensor devices 320 or the smart sensor device 330 when sensed data obtained by sensing in its own device does not meet a specific criterion. The specific criterion can be set in advance by using a parameter such as radio signal energy, a noise power level, a noise ratio or an error rate, for example. It is thereby possible to make determination about start (or extension) of secondary usage of a spectrum without depending on reception of data from the server 10.

As is understood from the foregoing description, according to an embodiment of the present invention, a sensing method of a communication environment to be used for determination of start or extension of secondary usage is selected appropriately according to the presence or absence of communication connection with a server integrally storing data related to a communication environment and a pattern of the communication connection. In the following section, a logical configuration of a communication device that executes control of a sensing method of a communication environment is described specifically.

[3-4. Logical Configuration of Device]

Figure 8:
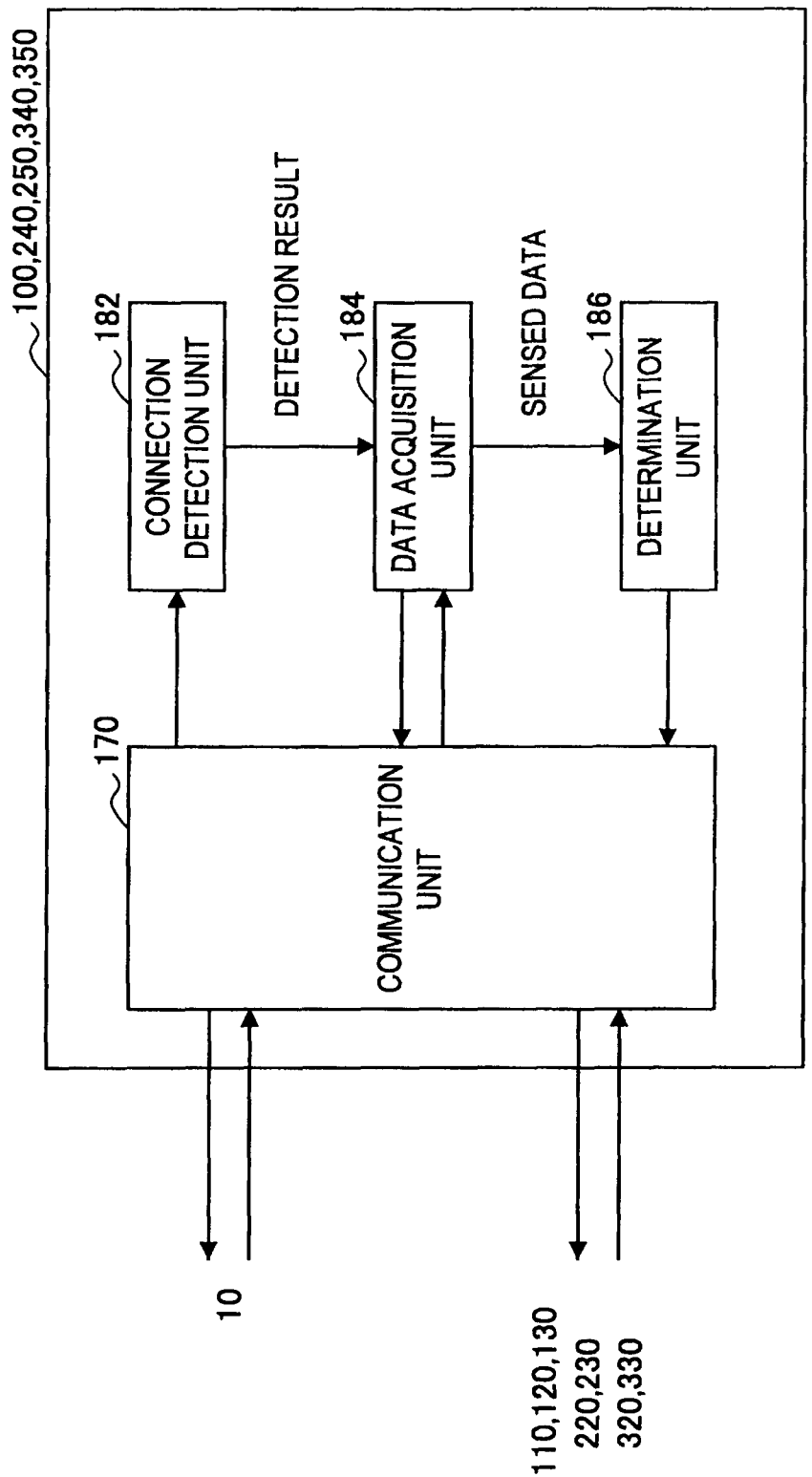
FIG. 8 is a schematic view showing a logical configuration of a control device according to an embodiment.

FIG. 8 is a block diagram showing a logical configuration of functions principally related to control of sensing of a communication environment, among the functions of the base station 100, the determination device 240, the advanced determination device 250, the determination device 340 or the advanced determination device 350 described above.

Referring to FIG. 8, each device (which is referred to hereinafter as a control device) includes a communication unit 170, a connection detection unit 182, a data acquisition unit 184 and a determination unit 186.

The communication unit 170 mediates communication connection between the control device and the server 10 and communication connection between the control device and another communication device (e.g. the communication device 110, the sensor device 120, the smart sensor device 130 etc.). In the case of the above-described communication system 1a or 1b, for example, communication connection between the control device and the server 10 through the communication unit 170 is implemented as wired connection by a desired communication protocol such as Ethernet (registered trademark) or FDDI. In the case of the above-described communication system 2a or 2b, for example, communication connection between the control device and the server 10 through the communication unit 170 is implemented as wireless connection by a desired communication protocol such as IEEE802.11a/b/g/n/s, Zigbee or WiMedia, for example. Further, in the case of the above-described communication system 3a or 3b, for example, communication connection between the control device and the server 10 through the communication unit 170 is not implemented.

The connection detection unit 182 detects the presence or absence of communication connection between the server 10 that integrally stores data related to a communication environment in a service area of the first communication service and the control device. After detecting communication connection with the server 10, the connection detection unit 182 further identifies whether the detected communication connection is wired connection or wireless connection.

The data acquisition unit 184 acquires data related to a communication environment in the nearby vicinity of the control device (e.g. inside the communication area 102, 204, 206, 304 or 306).

In the case where wired connection is available between the server 10 and the control device, the data acquisition unit 184 preferably receives (downloads) the data related to the communication environment surrounding the control device from the server 10. The data receivable from the server 10 is the above-described server data stored in the server 10. Specifically, data of a frequency currently in use for each location in a specific communication area, use history data of a frequency for each location, predicted data related to a condition of traffic predicted from the use history data or the like can be received from the server 10. The data acquisition unit 184 may sense additional data by communicating with another communication device or may further receive sensed data of a communication environment acquired by another communication device.

In the case where wired connection is unavailable and only wireless connection is available between the server 10 and the control device, the data acquisition unit 184 preferably receives the data related to a communication environment from the server 10 and further performs sensing in its own device also. In this case, it is possible to reduce the amount of data received from the server 10 and thereby reduce the load on wireless connection. Further, if the accuracy of data related to the communication environment surrounding its own device which is sensed by itself, the amount of data, the frequency of sensing or the like does not meet a predetermined criterion set in advance, the data acquisition unit 184 may additionally receive sensed data related to a communication environment from another communication device located in the vicinity. In this case also, the data acquisition unit 184 can make determination about start (or extension) of secondary usage by combining the data received from the server 10 and the data sensed by itself. It is thereby possible to reduce the frequency of sensing or the amount of data requited for distributed sensing compared to the case where communication connection with the server 10 is not detected, thereby reducing the load caused by distributed sensing.

In the case where wired connection and wireless connection are both unavailable between the server 10 and the control device, the data acquisition unit 184 preferably performs sensing in its own device and further performs distributed sensing over a wider area by using another communication device. In this case, the control device transmits an instruction for sensing of a communication environment or acquisition of sensed data to the sensor devices 320 and the smart sensor device 330 shown in FIG. 6 or 7, for example. The control device then receives sensed data of a communication environment from each device that has received the instruction. Because the sensed data in a wider range is relayed and integrated by the plurality of sensor devices 320 and the smart sensor device 330, it is possible to increase the accuracy of determination about start (or extension) of secondary usage of a spectrum without receiving the server data from the server 10.

Further, the data acquisition unit 184 may change the rang of distributed sensing depending on whether the secondary communication authentication node is the permanent secondary communication authentication node or the temporary secondary communication authentication node, for example. If it is the permanent secondary communication authentication node, distributed sensing in a narrow range may be executed, and if it is the temporary secondary communication authentication node, distributed sensing in a wide range may be executed, for example. The distributed sensing in a narrow range corresponds to distributed sensing without need of relay or multi-hop of sensed data as in the communication system 1a shown in FIG. 2, for example. On the other hand, the distributed sensing in a wide range corresponds to distributed sensing with need of relay or multi-hop of sensed data as in the communication system 1b shown in FIG. 3 or the communication system 2b shown in FIG. 5, for example.

The determination unit 186 determines the availability of usage of the second communication service that uses a part or whole of the spectrum assigned to the first communication service according to the spectrum policy based on the data acquired by the data acquisition unit 184 as described above.

[3-5. Flow of Processing]

Figure 9:
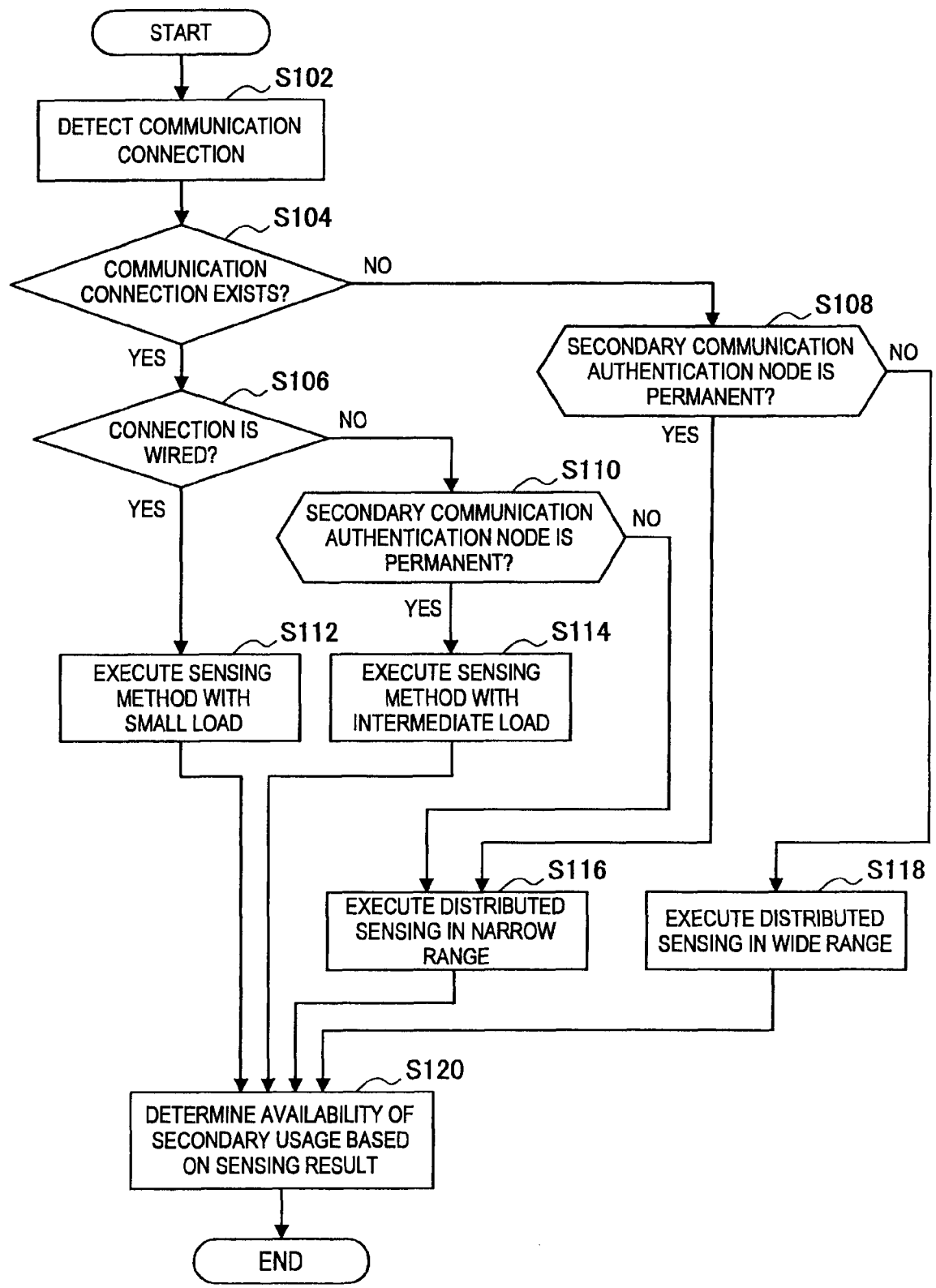
FIG. 9 is a flowchart showing an example of a flow of control processing according to an embodiment.

FIG. 9 is a flowchart showing an example of a flow of determination processing about the availability of secondary usage of a spectrum by the determination node (or the advanced determination node) constituting the configuration shown in FIG. 8.

Referring to FIG. 9, the presence or absence of communication connection with a server that stores data related to a communication environment in a service area of the first communication service and a connection pattern (wired or wireless) are detected by the connection detection unit 182 (S102). Then, a detection result of communication connection is output from the connection detection unit 182 to the data acquisition unit 184.

Next, the presence or absence of communication connection with the server is determined by the data acquisition unit 184 (S104). If there is no communication connection with the server, the process proceeds to the step S108. On the other hand, if there is communication connection with the server, it is determined by the data acquisition unit 184 whether the pattern of the communication connection is wired connection or wireless connection (S106). If the pattern of the communication connection is wired connection, the process proceeds to the step S112. If, on the other hand, the pattern of the communication connection is wireless connection, the process proceeds to the step S110.

In the step S108, it is further determined by the data acquisition unit 184 whether the secondary communication authentication node is the permanent secondary communication authentication node (S108). If the secondary communication authentication node is the permanent secondary communication authentication node, the process proceeds to the step S116. On the other hand, if the secondary communication authentication node is the temporary secondary communication authentication node, the process proceeds to the step S118.

In the step S110 also, it is further determined by the data acquisition unit 184 whether the secondary communication authentication node is the permanent secondary communication authentication node (S110). If the secondary communication authentication node is the permanent secondary communication authentication node, the process proceeds to the step S114. On the other hand, if the secondary communication authentication node is the temporary secondary communication authentication node, the process proceeds to the step S116.

In the step S112, a sensing method with the small load is executed by the data acquisition unit 184 by using wired connection with the server that stores data related to a communication environment (S112). Specifically, as described earlier, the data related to a communication environment which is integrally stored in the server 10 is downloaded by the data acquisition unit 184, for example.

Further, supplementary sensing of a communication environment may be performed by the data acquisition unit 184, for example.

In the step S114, a sensing method with the intermediate load is executed by the data acquisition unit 184 (S114). For example, the data related to a communication environment which is integrally stored in the server 10 is downloaded, and sensing of a communication environment and acquisition of sensed data from another communication device are performed by the data acquisition unit 184.

In the step S116, distributed sensing in a narrow range is executed by the data acquisition unit 184 (S116). For example, the data acquisition unit 184 gives an instruction for sensing of a communication environment to other communication devices located in the vicinity, so that sensed data is acquired from each device. The data acquisition unit 184 may first sense the surrounding communication environment in its own device and, when a sensing result does not satisfy a specific criterion, execute distributed sensing in a narrow range, for example.

In the step S118, distributed sensing in a wide range is executed by the data acquisition unit 184 (S118). For example, the data acquisition unit 184 gives an instruction for sensing of a communication environment and acquisition of sensed data to other communication devices located in the vicinity. Receiving the instruction, each communication device acquires sensed data from yet other communication devices located in the vicinity. Thus, in this case, sensed data related to a communication environment is relayed in a wider range compared to that in the step S116.

After that, the availability of usage (start or extension) of the second communication service that uses a part or whole of the spectrum of the first communication service is determined by the determination unit 186 based on the data related to a communication environment which is acquired by any method of the above-described steps S112 to S118 (S120).

In FIG. 9, the case of controlling a sensing method of a communication environment by dividing it into four sensing levels of S112 to S118 according to the state of communication connection is described. However, any of the sensing levels of S112 to S118 may be omitted, or a different sensing level may be added. For example, three sensing levels of S112, S114 or S116 and S118 may be used by omitting the determination whether the secondary communication authentication node is permanent in S108 and S110.

Further, in FIG. 9, a flow of determination processing as to the availability of secondary usage of a spectrum by the determination node (or the advanced determination node) is described. However, the processing of S102 to S118 related to control of a sensing method of a communication environment shown in FIG. 9 may be executed by the secondary communication authentication node, the smart sensor node, the sensor node or the like, for example.

4. EXAMPLE OF SENSED DATA

According to an embodiment of the present invention, the data acquisition unit 184 shown in FIG. 8 by way of illustration acquires the sensed data related to a communication environment that is sensed by the sensor node or the smart sensor node described above. The target communication resources of sensing by the sensor node or the smart sensor node are communication resources, which there is a possibility that they are used by the first communication service, and represented by frequency channels, resource blocks, codes or the like. Which range of the communication resources should be sensed is, for example, determined by monitoring the downlink broadcast channel of the first communication service (such as PBCH of LTE or the like). The sensed data may contain an identifier of a device which has sensed a communication environment and a sensing result, and may further contain location data of a device acquired using a global positioning system (GPS), a kind of a sensing algorithm, a time stamp or the like. Further, link data that is obtained by statistically summarizing the sensed data, scheduling information indicating surrounding communication environment regarding the first communication service and the like can be contained in the sensed data in a broad sense.

The location data of a device is data indicating the location of a device which has sensed a communication environment at the time of sensing, for example. The location data is used for determination about the availability of secondary usage of a spectrum by the determination node (or the advanced determination node), for example. Specifically, the determination node downloads a location information database which is externally prepared in advance to its own device. Data of the location information database may be data that is common to the data stored in the server 10 described above or data that is stored separately. The location information database contains channel assignment of the first communication service, channel usage history or the like in association with the location data. Thus, the determination node can retrieve channel assignment or channel usage history from the location information database by using the location data as a key, for example, and thereby evaluate the possibility that the secondary usage causes an adverse effect on the first communication service. Instead of downloading the location information database to its own device in advance, the determination node may make inquiry to an external database by using the location data as a key at the time of determining the availability of secondary usage, for example.

The kind of a sensing algorithm indicates what kind of value is to be sensed (or have been sensed), such as radio signal energy, a noise power level, a noise ratio (e.g. SNR or CNR) or an error rate (e.g. BER or PER), for example.

The sensing result contains the value of the sensing result according to the kind of a sensing algorithm described above. The value of the sensing result may be represented by soft bit (soft decision value) or hard bit (hard decision value). For example, it is preferred that the determination node (or the advanced determination node) represents the sensing result to be transmitted to the secondary communication authentication node by hard bit. In this case, a result of determining the availability of secondary usage according to the sensed value is represented by a logical value such as "0" or "1". This enables a decrease in traffic between nodes. On the other hand, the sensing result to be transmitted from the sensor node (or the smart sensor node) to the determination node (or the advanced determination node) is typically represented by soft bit.

The time stamp contains time when sensing of a communication environment is started, time when sensing of a communication environment ends or the like, for example.

In the case of transmitting or receiving the above-described sensed data between the equal nodes such as between the advanced determination nodes, an autonomous distributed communication protocol such as IEEE802.11s or WiMedia may be used. Alternatively, a hierarchical management communication protocol such as Zigbee may be used according to control of the node which has transmitted a beacon first. If the autonomous distributed communication protocol is used between nodes at the same level in the above-described function classifications FC1 to FC7, it is possible to easily change the topology of the secondary usage system in accordance with the location of devices. On the other hand, it is preferred to use the hierarchical management communication protocol according to control of a higher-order node between nodes at different levels in the function classifications FC1 to FC7.

5. SUMMARY

Control processing related to a sensing method of a communication environment for determination about the availability of secondary usage of a spectrum according to an embodiment is described above in detail with reference to FIGS. 1 to 9. According to the technique described in this specification, a method for sensing a communication environment to determine the availability of secondary usage of a spectrum is controlled according to the presence or absence of communication connection with a server integrally storing data related to a communication environment and a connection pattern. It is thereby possible to improve the accuracy of sensing of a communication environment at the time of start or extension of secondary usage or reduce the load for sensing.

The subject matter of each embodiment described in this specification is applicable to various types of modes of secondary usage. For example, as described above, it can be said that operation of relay node or femto-cell to cover a spectrum hole of the first communication service is a mode of secondary usage of spectrum. Further, the relationship between any one or more of macro-cell, RRH (Remote Radio Head), Hotzone, relay node, femto-cell and the like may form a mode of secondary usage of spectrum (such as heterogeneous network).

Although preferred embodiments of the present invention are described in detail above with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
   circuitry configured to
   detect presence or absence of communication connection between the communication device and a server, the server storing data related to a communication environment of a communication area where a first communication service is provided;
   acquire data related to a surrounding communication environment; and
   determine availability of usage of a second communication service using a part or whole of a spectrum assigned to the first communication service based on the acquired data,
   wherein when communication connection between the communication device and the server is not detected, the data is acquired in the communication device by sensing a communication environment surrounding the communication device or receiving the data from another communication device located near the communication device,
   wherein when communication connection between the communication device and the server is detected, the circuitry is further configured to identify whether the communication connection is a wired connection or a wireless connection, and
   wherein when the communication connection is identified as a wireless connection, the circuitry is further configured to instruct the another communication device to perform sensing of a communication environment by using a technique with a smaller load compared to when communication connection between the communication device and the server is not detected.

2. The communication device according to claim 1, wherein when the communication connection is identified as the wireless connection and the server is detected, the circuitry is further configured to acquire the data related to a communication environment by sensing the communication environment surrounding the communication device.

3. The communication device according to claim 1, wherein when the data related to the communication environment surrounding the communication device sensed by the data acquisition unit does not meet a specific criterion, the circuitry is further configured to receive, from the another communication device located near the communication device, data related to a communication environment sensed by the another communication device.

4. The communication device according to claim 1, wherein the circuitry is further configured to receive data related to the communication environment surrounding the communication device from the server.

5. The communication device according to claim 1, wherein when wired connection between the communication device and the server is detected, the circuitry is further configured to receive data related to the communication environment surrounding the communication device from the server.

6. The communication device according to claim 1, wherein when communication connection between the communication device and the server is not detected and data obtained by sensing the communication environment surrounding the communication device does not meet a specific criterion, the circuitry is further configured to receive data related to a communication environment from another communication device located near the communication device.

7. The communication device according to claim 1, wherein the circuitry is further configured to change a range for acquiring data related to a communication environment depending on whether a device for permitting usage of the second communication service has authority to permit usage of the second communication service permanently or temporarily.

8. The communication device according to claim 1, wherein data related to a communication environment is received from a plurality of other communication devices located near the communication device.

9. The communication device according to claim 1, wherein the circuitry is further configured to
   initiate a transmission of a beacon to a third communication device located near the communication device, to permit usage of the second communication service.

10. A non-transitory computer-readable medium having embodied thereon a program, which when executed by a computer controlling a communication device causes the communication device to execute a method, the method comprising:
    detecting presence or absence of communication connection between the communication device and a server, the server storing data related to a communication environment of a communication area where a first communication service is provided;

acquiring data related to a surrounding communication environment; and determining availability of usage of a second communication service using a part or whole of a spectrum assigned to the first communication service based on the acquired data, wherein when communication connection between the communication device and the server is not detected, the data is acquired in the communication device by sensing a communication environment surrounding the communication device or receiving the data from another communication device located near the communication device, wherein when communication connection between the communication device and the server is detected, the communication connection is identified as a wired connection or a wireless connection, and wherein when the communication connection is identified as a wireless connection, the another communication device is instructed to perform sensing of a communication environment by using a technique with a smaller load compared to when communication connection between the communication device and the server is not detected.

11. A communication control method in a communication device, the method comprising:

detecting presence or absence of communication connection between the communication device and a server, the server storing data related to a communication environment of a communication area where a first communication service is provided;

acquiring data related to a surrounding communication environment; and determining availability of usage of a second communication service using a part or whole of a spectrum assigned to the first communication service based on the acquired data, wherein when communication connection between the communication device and the server is not detected, the data is acquired in the communication device by sensing a communication environment surrounding the communication device or receiving the data from another communication device located near the communication device, wherein when communication connection between the communication device and the server is detected, the communication connection is identified as a wired connection or a wireless connection, and wherein when the communication connection is identified as a wireless connection, the another communication device is instructed to perform sensing of a communication environment by using a technique with a smaller load compared to when communication connection between the communication device and the server is not detected.

* * * * *